US006847687B2

United States Patent
Fujita et al.

(10) Patent No.: US 6,847,687 B2
(45) Date of Patent: Jan. 25, 2005

(54) AUDIO AND VIDEO PROCESSING APPARATUS

(75) Inventors: Takeshi Fujita, Takatuki (JP); Takashi Katayama, Hirakata (JP); Masahiro Sueyoshi, Hirakata (JP); Kousuke Nishio, Neyagawa (JP); Masaharu Matsumoto, Katano (JP); Akihisa Kawamura, Hirakata (JP); Kazutaka Abe, Kadoma (JP); Ryoji Yamaguchi, Katano (JP); Makoto Meiarashi, Hirakata (JP); Ken Monda, Takatuki (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 470 days.

(21) Appl. No.: 09/795,977

(22) Filed: Mar. 1, 2001

(65) Prior Publication Data

US 2001/0031007 A1 Oct. 18, 2001

(30) Foreign Application Priority Data

Mar. 8, 2000 (JP) ........................................ 2000-062839

(51) Int. Cl.[7] .............................................. H04N 7/12
(52) U.S. Cl. ................................................ 375/240.25
(58) Field of Search ...................... 348/725; 375/240.01, 375/240.03, 240.12–240.16, 240.18, 240.2, 240.24, 240.25, 240.26, 240.28; 382/232; 704/500; 712/35; 386/33, 46, 95–96, 109, 112, 125, 126, 131; H04N 7/12

(56) References Cited

U.S. PATENT DOCUMENTS

| 6,041,400 | A | * | 3/2000 | Ozcelik et al. ............... 712/35 |
| 6,185,339 | B1 | * | 2/2001 | Ozaki ......................... 382/232 |
| 6,301,650 | B1 | * | 10/2001 | Satou ........................... 712/35 |
| 6,310,921 | B1 | * | 10/2001 | Yoshioka et al. ...... 375/240.26 |
| 6,380,984 | B1 | * | 4/2002 | Inoue et al. ................. 348/725 |
| 2003/0014264 | A1 | * | 1/2003 | Fujii et al. .................. 704/500 |

FOREIGN PATENT DOCUMENTS

| JP | 10-341422 A | 12/1998 |
| JP | 11-239348 A | 8/1999 |

* cited by examiner

*Primary Examiner*—Richard Lee
(74) *Attorney, Agent, or Firm*—Smith Patent Office (57) ABSTRACT

According to the data amount and the nature of a video stream and an audio stream included in a program stream which is to be decoded, an audio and video processing apparatus performs processing while allocating higher priority to one or the other of the video and audio streams. Without any increase in circuit complexity or clock speed, this apparatus can reproduce streams in at least two formats, in which the ratios of the amounts of encoded signal data and of the amounts of calculation required for decoding for the video and the audio are very different.

15 Claims, 6 Drawing Sheets

AUDIO AND VIDEO PROCESSING APPARATUS

BACKGROUND OF THE INVENTION

1. Field of the Invention

The present invention relates to an audio and video processing apparatus which performs decompression of compressed video and audio data, compression of video and audio data, graphics processing, and the like.

2. Discussion of the Related Art

In recent years the art of compression and decompression of digital moving image data has become established, and the LSI art has also improved; and various types of audio and video processing apparatus such as decoders for decompressing compressed video and audio data, encoders for compressing video and audio data, graphics processing devices for performing graphics processing, and the like have gained in importance.

Figure 1:
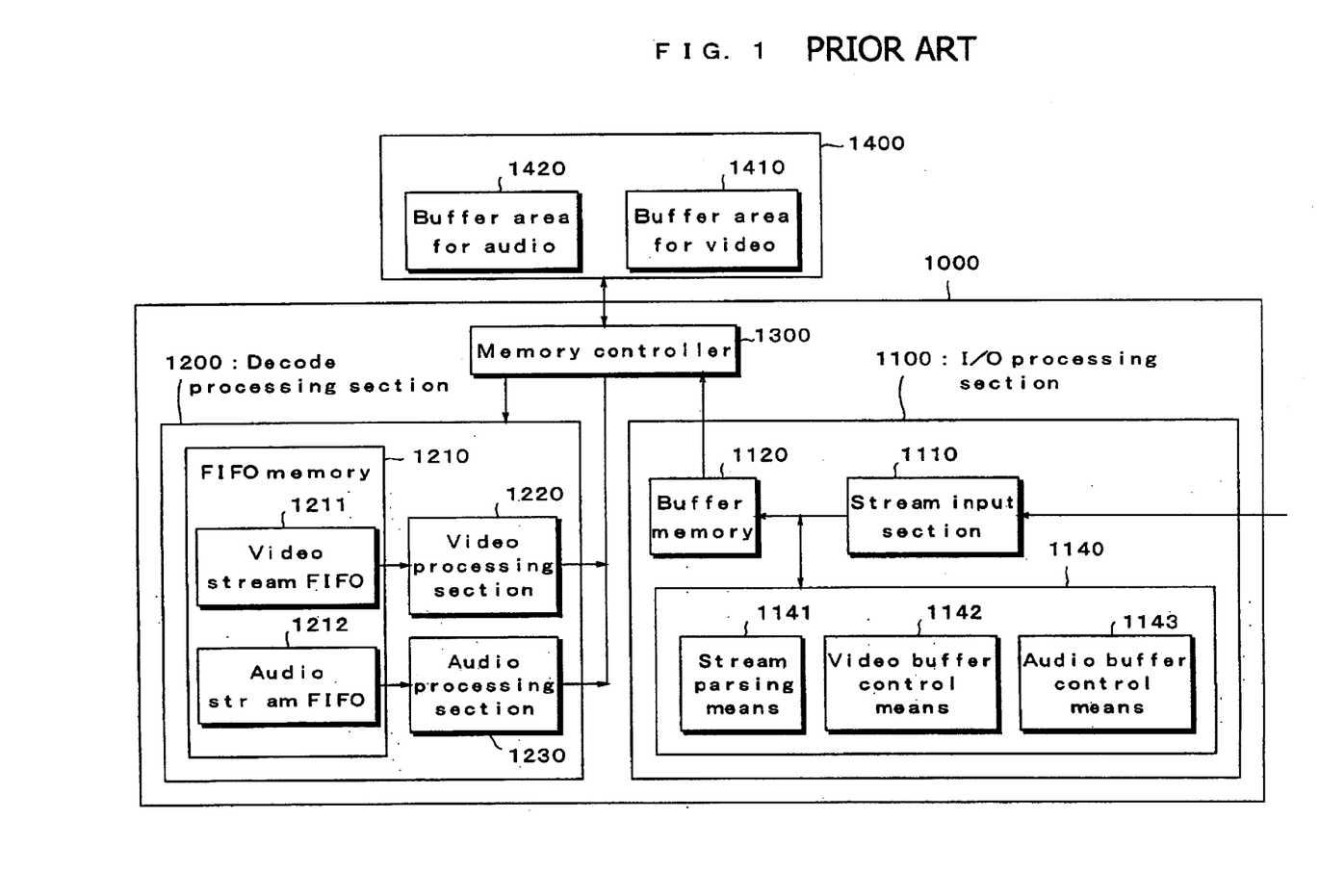
FIG. 1 is a block diagram showing the structure of an exemplary prior art audio and video reproduce apparatus.

As one prior art, there is a type of audio and video processing apparatus which decompresses a video and audio stream which have been compressed according to the DVD-Video standard. Audio signals known in this DVD-Video standard are generally stored in the linear 16 bit 2 channel PCM format at the sampling frequency of 48 kHz, and the data quantity for the video signal is overwhelmingly greater than the quantity for the audio signal. Along with the improvement of the LSI art, there are nowadays various versions of such audio and video processing apparatus which have been LSI-integrated onto a single chip. Among such audio and video processing apparatus, a typical example of an audio and video processing apparatus which decompresses compressed video and audio streams in the DVD-Video standard, is shown in FIG. 1 of the drawings.

A main section 1000 of this audio and video processing apparatus includes an input and output processing section 1100, a decode processing section 1200, and a memory controller 1300, and it is connected to an external memory 1400. The input and output processing section 1100 is made up of a stream input section 1110 which inputs a program stream from external devices, a buffer memory 1120 which serves as an internal buffer during data transfer, and an I/O processor 1140 which operates while changing over between a plurality of task means. The decode processing section 1200 is made up of a first in first out (hereinafter abbreviated as "FIFO") memory 1210, a video processing section 1220 which decodes the video stream, and an audio processing section 1230 which decodes the audio stream. The FIFO memory 1210 includes a video stream FIFO 1211 which transfers the video stream to the video processing section 1220, and an audio stream FIFO 1212 which transfers the audio stream to the audio processing section 1230. And the memory controller 1300, performs data input and output between the main section 1000 and the external memory 1400.

Further, the external memory 1400, which is connected externally, is allocated between a buffer area 1410 for video and a buffer area 1420 for audio.

Moreover, the stream parsing means 1141 in the I/O processor 1140 divides the data stream which has been inputted by the stream input section 1110 and has been transferred to the internal buffer memory 1120 into audio and video streams, and commands the memory controller 1130 to transfer the data to the buffer areas 1400 and 1410 for video and audio within the external memory 1400. The video buffer control means 1142 performs transfer of the video stream from the buffer area 1410 for video to the video stream FIFO 1211. And the audio buffer control means 1143 performs transfer of the audio stream from the audio buffer area 1420 to the audio stream FIFO 1212.

As shown in FIG. 1, first, when a program stream according to the DVD-Video standard is input from the stream input section 1110, the stream parsing means 1141 of the I/O processor 1140 divides it into a video stream and an encoded signal for audio. And, via the memory controller 1300, the encoded signal for video is transferred to the video buffer area 1410, while the encoded signal for audio is transferred to the audio buffer area 1420. Next, the video buffer control means 1142 transfers the video stream to the video stream FIFO 1211 from the video buffer area 1410 in response to a stream supply request from the video processing section 1220. The audio buffer control means 1143 transfers the audio stream to the audio stream FIFO 1212 from the audio buffer area 1420 in response to a stream supply request from the audio processing section 1230. The video processing section 1220 receives the video stream signal from the video stream FIFO 1211, performs decoding thereof, and generates a video output signal. And the audio processing section 1230 receives the audio stream signal from the audio stream FIFO 1212, performs decoding thereof, and generates an audio output signal.

Most of such audio and video processing apparatus, the video stream conforms to the DVD-Video standard, and generally contains a moving image. In this case, the amount of data in the video stream which is contained in the program stream is remarkably greater as compared to the audio stream, and almost always the amount of processing required for decoding the video stream is greater than that required for decoding the audio stream. For example, it is almost always the case that the data transfer processing capacity of the video buffer control means 1142 is remarkably greater by comparison with that of the audio buffer control means 1143. Furthermore, in the decode processing section 1200, the processing priority level accorded to the video processing section 1220 is higher than that accorded to the audio processing section 1230. In the DVD-Video standard, most audio signals, which are of the linear PCM format, contain a level of information roughly equal to that of a compact disk, and are 2 channel 16 bit linear PCM signals sampled at 48 kHz.

However, with an audio and video processing apparatus of this type, the video processing section and the audio processing section are independent and individually established in advance. Further as another video standard, there is the known DVD-Audio standard, with which, for the video and audio input, the ratios of the transfer amounts of encoded signals and of decode calculation amounts greatly differ from those of a program stream according to the DVD-Video standard. Since with this format the amount of information in the audio signal is increased so as to enable higher quality sound reproduction, six channel 24 bit linear PCM with sampling frequency of 96 kHz, or two channel 24 bit linear PCM with sampling frequency of 192 kHz, may be selected. In this case, the video signal displays still images at fixed intervals. If an audio and video processing apparatus is to serve for processing a program stream according to the DVD-Audio standard as well as to the DVD-Video standard, then the data transfer capability of the audio buffer control means and the calculation processing capability of the audio processing section must be higher than in the case of decoding a program stream according to the DVD-Video standard. In order to provide this enhanced capability, circuit complexity and clock speed must be increased, and as a result cost and power consumption undesirably increase.

SUMMARY OF THE INVENTION

The present invention has been formulated after consideration of these type of problems with the prior art described above, and proposes an audio and video processing apparatus which, without increase in circuit complexity or clock speed, can reproduce at least two different types of data format between which the ratios of the transfer amounts of encoded signal and the amounts of decoding calculation for the inputted audio and video differ radically, such as, for example, program streams according to the DVD-Video standard and according to the DVD-Audio standard.

The audio and video processing apparatus according to the present invention decodes and reproduces data streams of at least two types, including video and audio streams, in which the amounts of video and audio information differ from one another, and includes an external memory, a decode processing section, a stream parsing means, first and second buffer control means, and a buffer control assignment means. The external memory includes buffer areas for video and audio which store a video stream and an audio stream, respectively. The decode processing section includes a video stream FIFO and an audio stream FIFO which respectively transfer a video stream and an audio stream from the external memory, and decodes the video and audio streams. The stream parsing means separates an inputted data stream into a video and an audio stream, and directs data transfer to the buffer areas for video and audio within the external memory. The first and second buffer control means perform transfer of video and audio streams from the buffer areas for video and audio within the external memory respectively to the video and audio stream FIFOs, and their data transfer amounts differ from one another. And the buffer control assignment means assigns the first and second buffer control means, the buffer areas for video and audio, and the video and audio stream FIFOs, according to the type of data stream.

According to the present invention as described above, by providing the buffer control assignment means, it becomes possible to change the assembly of the buffer control tasks which perform transfer of the encoded signals from the buffer areas to the FIFOs, according to the video stream and the audio stream included in the program stream which is being decoded.

Accordingly, as compared with a case in which the buffer control tasks which handle video and audio encoded data are fixedly assigned, data transfer of the encoded signals becomes possible with an assembly which is altered as appropriate for the characteristics of the streams, so that as a consequence it becomes possible to enhance the compatibility with the input stream without any increase in cost, since it is not required to increase the processing capability of both of the buffer control tasks.

Further, by including in the structure a host interface section, a host communication storage means, and a buffer control assignment means, it becomes possible to decide the assignment of the first and second buffer control means and the video and audio buffer areas and stream FIFOs according to audio encoding format information, and thereby it is easy to assign then appropriately to input streams in which the ratios of the amounts of encoded signal data and of the amounts of calculation required for decoding for the video and the audio are very different, since, for example, assignment of the buffer control tasks in the case of decoding according to the DVD-Video standard and in the case of decoding according to the DVD-Audio standard can be easily designated.

Further, by including in the structure a host interface section, a host communication storage means, and a buffer control assignment means, it becomes easy to realize compatible decoding capability for both DVD-Video and DVD-Audio, without any requirement for performance increase for the buffer control tasks, since when reproducing a program stream conforming to the DVD-Audio standard the buffer control processing is performed while giving higher priority to the audio processing, while when reproducing a program stream conforming to the DVD-Video standard the buffer control processing is performed while giving higher priority to the video processing.

DESCRIPTION OF THE PREFERRED EMBODIMENT

Figure 2:
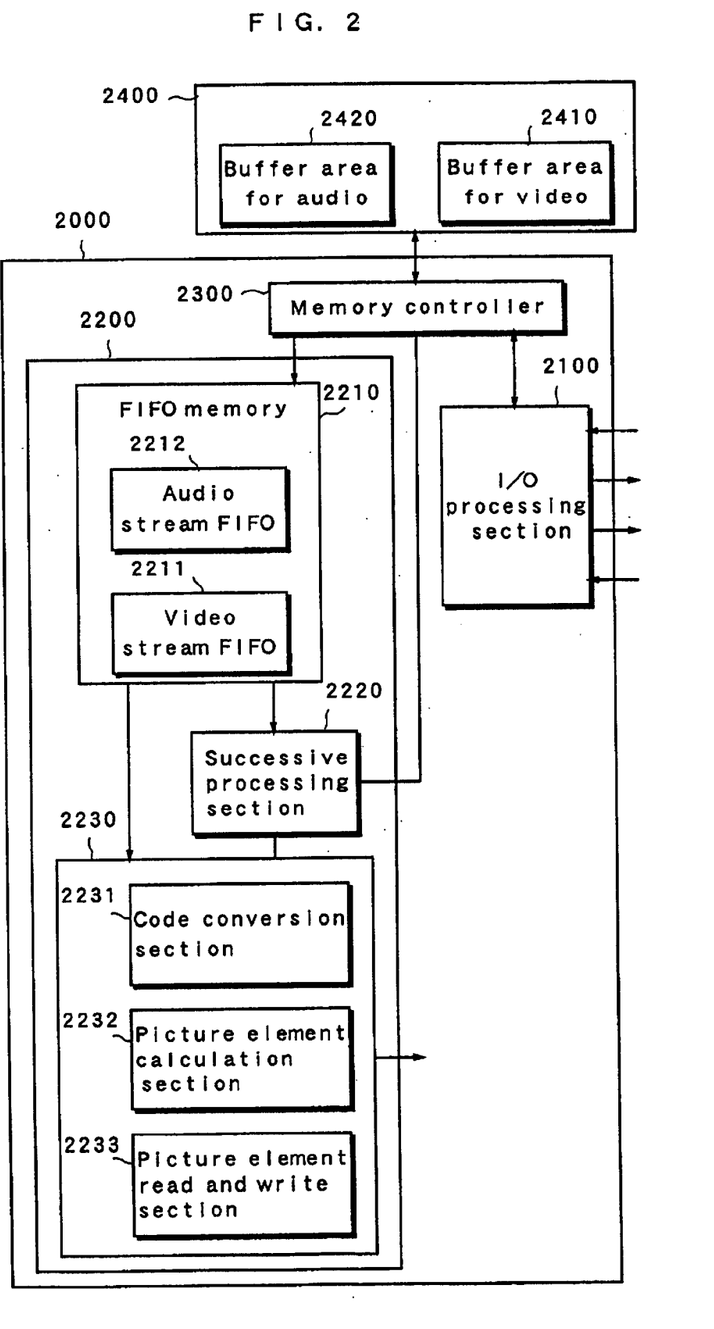
FIG. 2 is a block diagram showing the overall structure of an audio and video processing apparatus according to a preferred embodiment of the present invention.

The preferred embodiment of the audio and video processing apparatus according to the present invention will now be explained with reference to the drawings. FIG. 2 is a block diagram showing the overall structure of an audio and video processing apparatus according to the preferred embodiment of the present invention.

The audio and video processing apparatus according to this embodiment, in addition to decoding a program stream conforming to a first DVD-Video standard which is a first video and audio standard for recording video and audio, also serves for decoding a program stream conforming to a second DVD-Video standard, which is a second standard for recording video and audio in which the amount of video information is less but the amount of audio information is more than in the first video and audio standard.

A main section 2000 of this audio and video processing apparatus comprises an input and output processing section 2100, a decode processing section 2200, and a memory controller 2300, and performs input and output processing and decoding in parallel. Further, an external memory 2400 is utilized as a working memory for temporarily storing an MPEG stream and audio data after decoding, and as a frame memory for storing video data after decoding.

The input and output processing section 2100 performs the following input and output processing, which takes place asynchronously with the internal operation of the main section 2000:

(a) It inputs a program stream which is asynchronously input into external memory and temporarily stores it in the external memory 2400;

(b) It supplies video and audio streams which have been stored in the external memory 2400 to the decode processing section 2200;

(c) It reads out from the external memory 2400 video data and audio data which have been decoded, and outputs them at output rates respectively corresponding to those of an external display device and of an audio output device (not shown in the figures).

Figure 3:
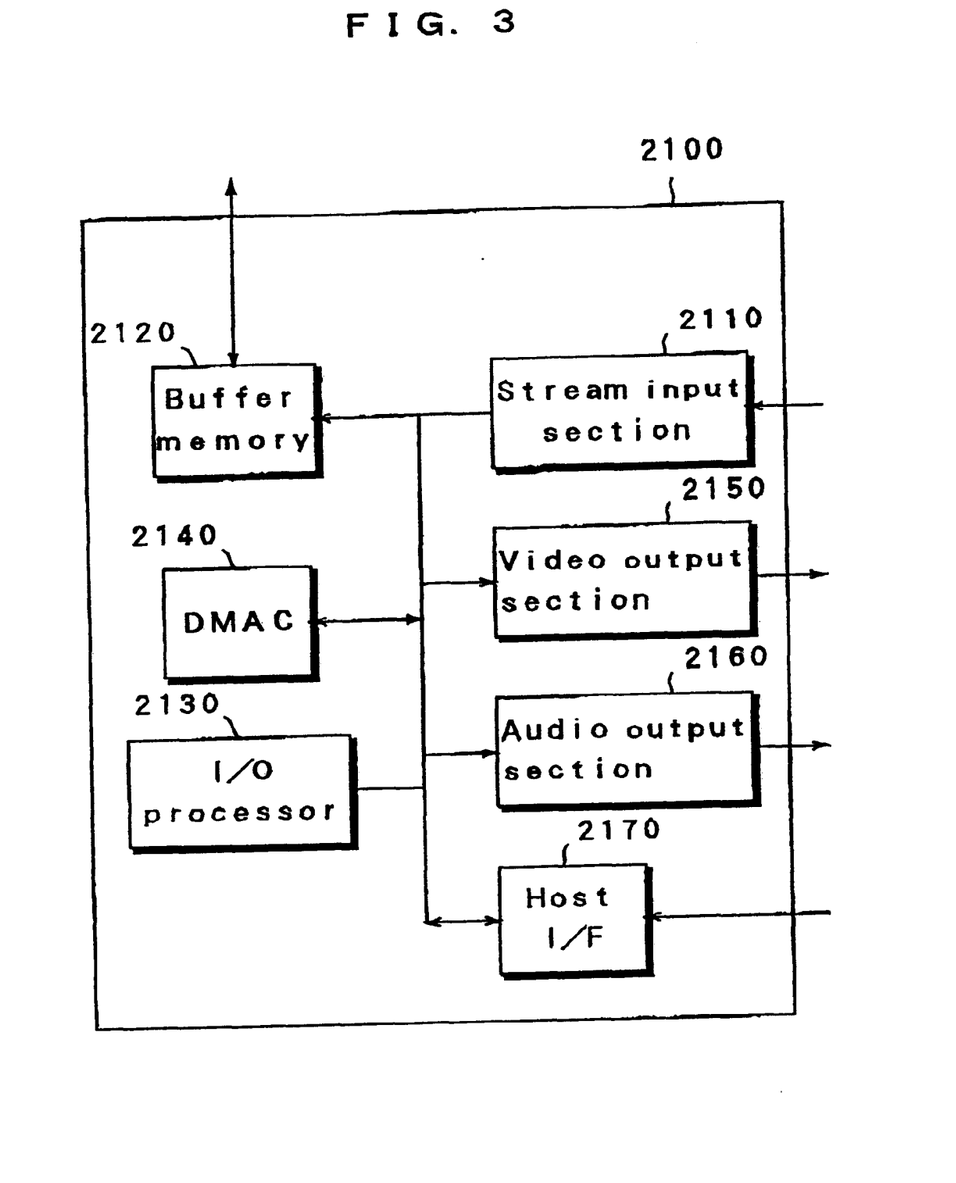
FIG. 3 is a block diagram showing the structure of an I/O procession section of the audio and video processing apparatus according to the embodiment.

The input and output processing section 2100, as shown in FIG. 3, comprises a stream input section 2110, a buffer memory 2120, an I/O processor 2130, a DMAC (Direct Memory Access Controller) 2140, a video output section 2150, an audio output section 2160, and a host I/F section 2170.

The stream input section 2110 converts a program stream which is input serially from the outside into parallel data, and transfers it to the buffer memory 2120 under control of the I/O processor 2130.

The buffer memory 2120 is an buffer memory which temporarily stores the data stream which has been transmitted from the stream input section 2110. The I/O processor 2130 transfers the data stream which has been stored in the buffer memory 2100 to the external memory 2400 via the memory controller 2300.

The external memory 2400 comprises SDRAX (Synchronous Dynamic Random Access Memory) chips, and is a memory which temporarily stores the data stream which has been transmitted from the buffer memory 2120 via the memory controller 2300. In this embodiment, it will be supposed that the video stream and the audio stream are respectively stored in a video buffer area 2410 and an audio buffer area 2420. Further, the external memory 2400 also stores video data after decoding (hereinafter termed "frame data") and audio data after decoding.

Figure 4:
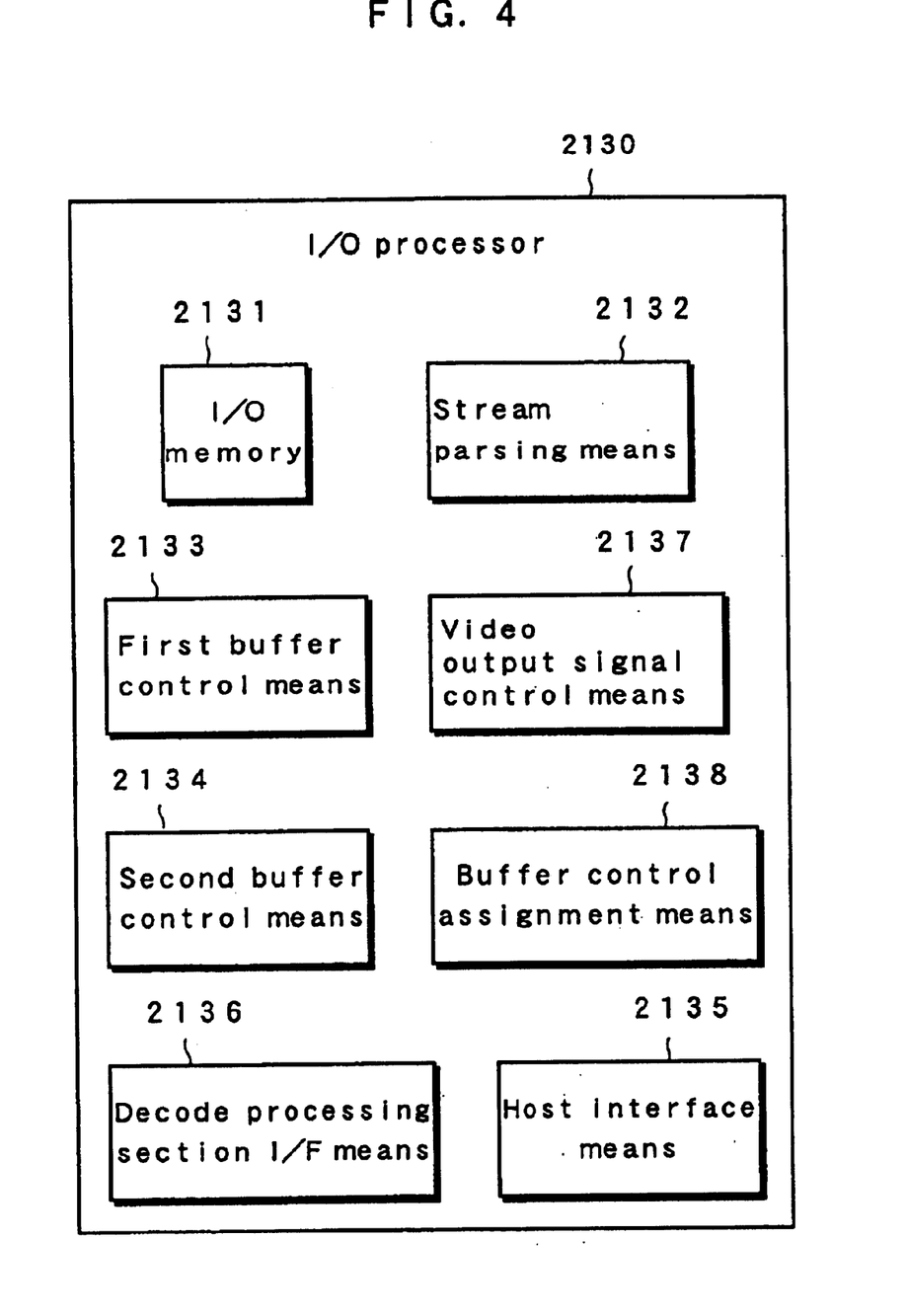
FIG. 4 is a block diagram showing the structure of an I/O processor of the audio and video processing apparatus according to the embodiment.

The I/O processor 2130, as shown in FIG. 4, controls data input and output among the stream input section 2110, the buffer memory 2120, and video and audio stream FIFOs 2211 and 2212. Further, it controls input and output to and from the external memory 2400 via the memory controller 2300. In other words, it controls data transfer (DMA transfer) via the paths described in (1) through (4) below.
(1) stream input section 2110→buffer memory 2120→memory controller 2300→external memory 2400
(2) external memory 2400→memory controller 2300→FIFO memories 2211 and 2212
(3) external memory 2400→memory controller 2300→buffer memory 2120→video output section 2150
(4) external memory 2400→memory controller 2300→buffer memory 2120→audio output section 2160

The I/O processor 2130 controls independently the transfers via these paths of the video stream and the audio stream in the program stream. Further, the paths (1) and (2) are transfer paths for the streams before decoding, and for these transfer paths the I/O processor 2130 transfers the encoded video signal and the audio stream individually. The paths (3) and (4) are respectively transfer paths for video data and audio data after decoding. The video and audio data after decoding are transferred to the external display device (not shown in the figures) and the audio output device (not shown either) in accordance with their respective output rates.

In this embodiment, the I/O processor 2130 is a multi threading type processor which can handle data input and output including the above described paths (1) through (4) by time division multiplexing. Each thread is executed for a predetermined time period, and it is arranged that real time operation can be assured, in order to execute processing for the allocated time shares. Further, the I/O processor 2130 is internally equipped with an I/O memory 2131 which is used as a working memory for each thread, and it moreover internally comprises a buffer control assignment means 2138 which controls the task assignment of stream transfer to the external memory 2400 and the FIFO memory 2210. In this embodiment, for the convenience of explanation, the arrangement of the various processing tasks within the I/O processor 2130 is set up as described below.

A stream parsing means 2132 is a task which performs analysis of the program stream which is inputted by the stream input section 2110, takes a decision as to whether or not the required data for AV decoding is available, and performs separation processing for each of the audio and video and sub picture streams and controls their transmission to the buffer memory 2120. The result of this is, for example, that it can select an audio stream which is chosen by an external host CPU or the like from equivalent multi-lingual program streams.

A first buffer control means 2133 is a task which specifically manages data transmission via the above described path (2), and performs transmission control of the video or audio stream under control of the buffer control assignment means 2138. If this task is allocated by the buffer control assignment means 2138 to video stream transmission, the first buffer control means 2133, in response to a request from the decode processing section 2200, transfers the video stream data from the video buffer area 2410 of the external memory 2400 via the memory controller 2300 to the video stream FIFO 2211 in the FIFO memory 2210. Further, if this task is allocated to audio stream transmission, the first buffer control means 2133, in response to a request from the decode processing section 2200, transfers the audio stream data from the audio buffer area 2420 of the external memory 2400 via the memory controller 2300 to the audio stream FIFO 2212 in the FIFO memory 2210.

A second buffer control means 2134 is a task which manages data transfer via the above described path (2), just like the first buffer control means 2133, and which also manages the transfer of audio output data by managing data transfer via the path (4) etc. By contrast to the first buffer control means 2138 which is dedicated to managing the transfer of data via the above described path (2), this second buffer control means 2134 also concurrently deals with tasks other than data transfer via the above described path (2). To this extent, its maximum transfer rate is lower than that of the first buffer control means 2133. Denoting the maximum possible data transfer amounts of the first and second buffer control means 2133 and 2134 by X and Y respectively, and the number of their processing clock cycles per unit time period by A and B respectively, the relationships X>Y and A>B will be assumed.

A host interface means 2135 is a task which performs signal transmission via the host I/F 2170 with an external host processor which controls this audio and video control apparatus. For example, various host communication information inputted from the external processor such as audio decoder selection information which selects the audio encoding method is stored by this task in the I/O memory 2131.

A decode processing section interface means 2136 is a means of signal transmission with the decode processing section 2200, and by this task, for example, control information from the host processor is transmitted to the decode processing section 2200.

A video output signal control means 2137 is a task which performs data transfer via the above described path (3), and which outputs a video output signal internal to the external memory 2400 to the video output section 2150.

Further, in this embodiment, the buffer control assignment means 2138 reads in audio decoder selection information which has been stored in the I/O memory 2131 by the host interface means 2135. And, if the audio decoder according to the DVD-Video standard is selected, it allocates the first buffer control means 2133 for video stream transfer, while it allocates the second buffer control means 2134 for audio stream transfer. Further, if the audio decoder according to the DVD-Audio standard is selected, it allocates the first buffer control means 2133 for audio stream transfer, while it allocates the second buffer control means 2134 for video stream transfer. Now, since a program stream in the DVD-Video standard in which a video stream for a moving image and an audio stream are multiplexed, therefore the amount of data taken up by the video stream is very large by comparison to the audio stream. By contrast, a program stream in the DVD-Audio standard consists entirely of an audio stream, except for still images for preloading. Accordingly in the former case the video, and in the latter case the audio, is allocated to the first buffer control means which can handle the greater maximum data transfer amount.

In the decode processing section 2200, the video and audio streams which are supplied by the input and output processing section 2100 are decoded independently in parallel with the operation of this input and output processing section 2100, and the video data and audio data after decoding are stored in the external memory 2400 by signal communication with the I/O processor.

The decode processing section 2200 of FIG. 2 includes the FIFO memory 2210, a successive processing section 2220, and a routine task processing section 2230. The decoding of the video stream is allocated between the respective operations of the successive processing section 2220 and the routine task processing section 2280. In other words, the successive processing section 2220 performs header analysis processing of the macro block header portions of the video stream, while the routine task processing section 2230 performs decoding of the macro block main sections of the video stream. In this manner, in the decode processing section 2200, the successive processing section 2220 and the routine task processing section 2230 each perform their respective processing once for each macro block in the compressed video stream. On the other hand, the successive processing section 2220 performs the decoding of the audio stream (hereinafter abbreviated as "audio decoding") in the time slot between the header analysis processing for one macro block and the header analysis processing for the next macro block.

It should be noted that, for a program stream in the MPEG standard, since detailed specification of the data structure of the video stream and its macro block can be found in published references, for example (ISO/IEC 13818-2 "Information Technology-Generic Coding of Moving Pictures and Associated Audio: Part2-Video"), therefore explanation thereof herein will be curtailed.

The FIFO memory 2210 comprises the two FIFOs, and these are allocated as the FIFO memory 2211 for video and the FIFO memory 2212 for audio. They store the video stream and the audio stream transferred from the external memory 2400 under the control of the I/O processor 2130 in the first-in first-out manner. Moreover, the FIFO memory 2211 for video is linked to the routine task processing section 2230 which decodes the macro block main portions of the video stream, while the FIFO memory 2212 for audio is linked to the successive processing section 2220 which performs the entire decoding of the audio stream.

Figure 5:
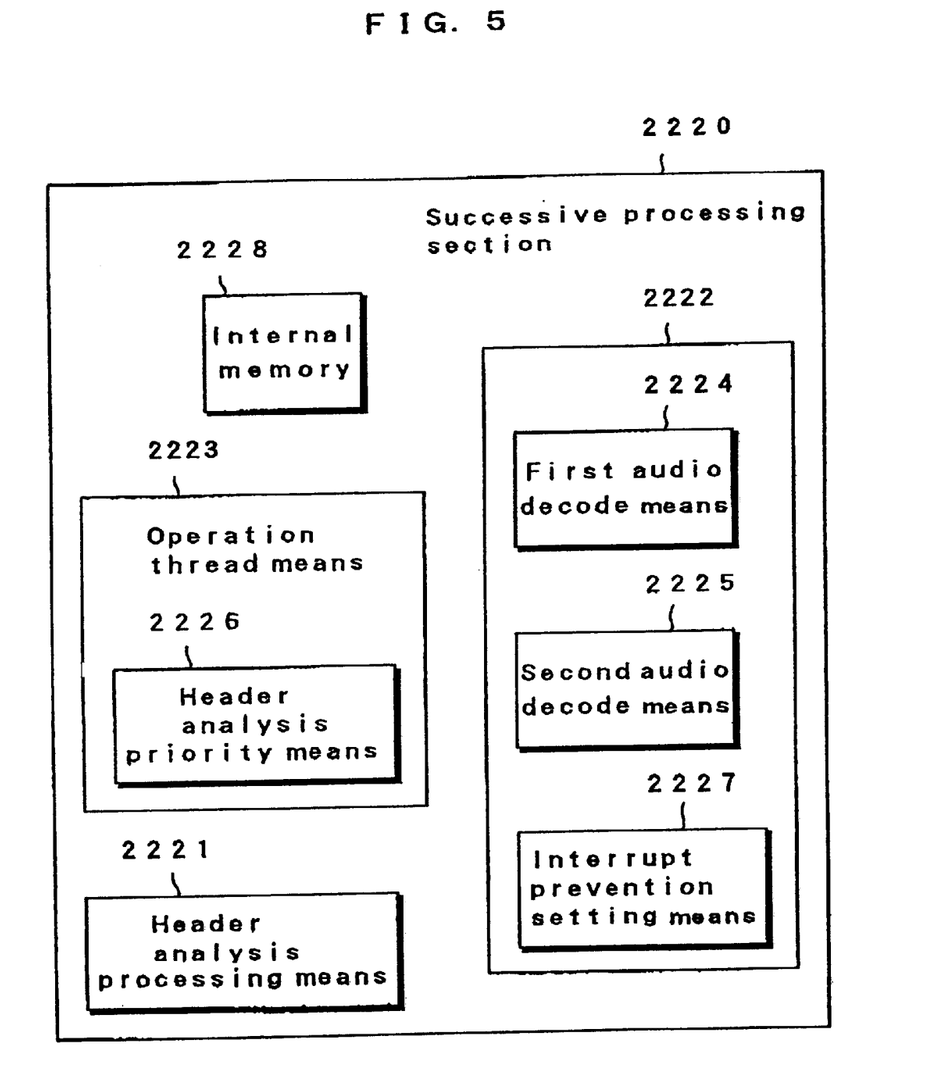
FIG. 5 is a block diagram showing the structure of a successive processing section of the audio and video processing apparatus according to the embodiment.

As shown in FIG. 5, the successive processing section 2220 comprises a processor and an internal memory 2228, and it executes thread programs stored in this memory (hereinafter abbreviated as "threads"). Moreover, by "thread" here is meant a unitary processing program which is performed in a multi-threaded environment. The successive processing section 2220 comprises a header analysis processing means 2221 which principally performs header analysis processing of the macro blocks of video, an audio processing means 2222 which decodes the audio stream, and an operation thread means 2223 which performs switching over of the video processing means and the audio processing means.

Since header analysis processing takes priority over audio decoding in the successive processing section 2220, the operation thread means 2228 is made by an internal header analysis priority means 2226 to perform header analysis processing at higher priority than audio decoding.

Here, the header analysis processing by the header analysis processing means 2221 includes analysis of header information of the macro blocks and movement vector calculation. The information (the header information) needed for decoding the macro block main portions is stored in the header portions of the macro blocks, and the successive processing section 2220 outputs the various data obtained by this analysis to the routine task processing section 2230. A movement vector is a vector which designates an 8*8 rectangular region in a reference frame, and which designates, for the block in question, with which rectangular region in the reference frame the difference has been taken.

On the other hand, in the audio decoding by the audio processing means 2222, the analysis of the header portions of the audio stream and the decoding of the main data portions is performed independently by the successive processing section 2220, and only internally. Due to this, interruption and restarting of the audio decoding is easier, as compared to the header analysis processing.

Comparing audio decoding by the first audio decode means 2224 according to the DVD-Video standard with the video processing which must handle moving image reproduce processing, for the audio processing, sufficient processing can be performed in the time slot between the header analysis for a macro block and the next header analysis, because the amount of processing is less. Due to these reasons, the successive processing section 2220 is constituted so as to perform the header analysis processing with higher priority than the audio decoding.

With audio decoding by the second audio decode means 2225 according to the DVD-Audio standard, it cannot be said that the data transfer amount of the stream and the amount of calculation required for the decoding are definitely less, as compared to the video processing which must handle still image reproduce processing in which the shortest display interval is 0.4 seconds.

If it is supposed that, for the video processing, processing is continued just as normal in the time slot between the header analysis of a macro block and the header analysis of the next block, then, when directly after changing over of the reproduced still image the next video stream for still image display starts to be decoded by the header analysis priority means 2226 internal to the operation thread means 2223, since the header analysis processing is performed with higher priority than the audio decoding, as a result a transitory deficiency of audio decoding occurs, which is undesirable.

To address this problem, the audio processing means 2222 is provided with an interrupt prevention setting means 2227, and, in the second audio decode means 2225 which corresponds to the DVD-Audio standard, thread interruption for the operation thread means 2223 is restricted by this interrupt prevention setting means 2227, so that real time operation for audio processing is assured.

The routine task processing section 2230 internally comprises a code conversion section 2231, a picture element calculation section 2232, and a picture element read and write section 2233. During the video decoding for a macro block main portion, the routine task processing section 2230 performs as routine task processing, by the pipeline method, in this specified order, variable length code decoding (VLD) by the code conversion section 2231, inverse quantization (IQ) and inverse discrete cosine transformation (IDCT) by the picture element calculation section 2232, and motion compensation (IC) by the picture element read and write section 2233 However, the routine task processing section 2230 not only performs VLD for the main portion of the macro block but also for the header portion of the macro block, and outputs the data which have been decoded from the header portion to the successive processing section 2220. The routine task processing section 2230, for movement compensation, stores the block after decoding via the memory controller 2300 in the external memory 2400, which serves as a frame memory, The audio processing means 2222 comprises the first audio decode means 2224 which operates following the DVD-Video standard, and the second audio decode means 2225 which operates following the DVD-Audio standard, and further internally comprises the interrupt prevention setting means 2227. The first audio decode means 2224 may be a decode means which handles, for example, the Dolby digital format (commonly termed AC3). or MPEG audio (ISO/IEC 11172-3 or 13818-3). And the second audio decode means 2225 way be a decode means which handles the Packed PCM format.

Figure 6:
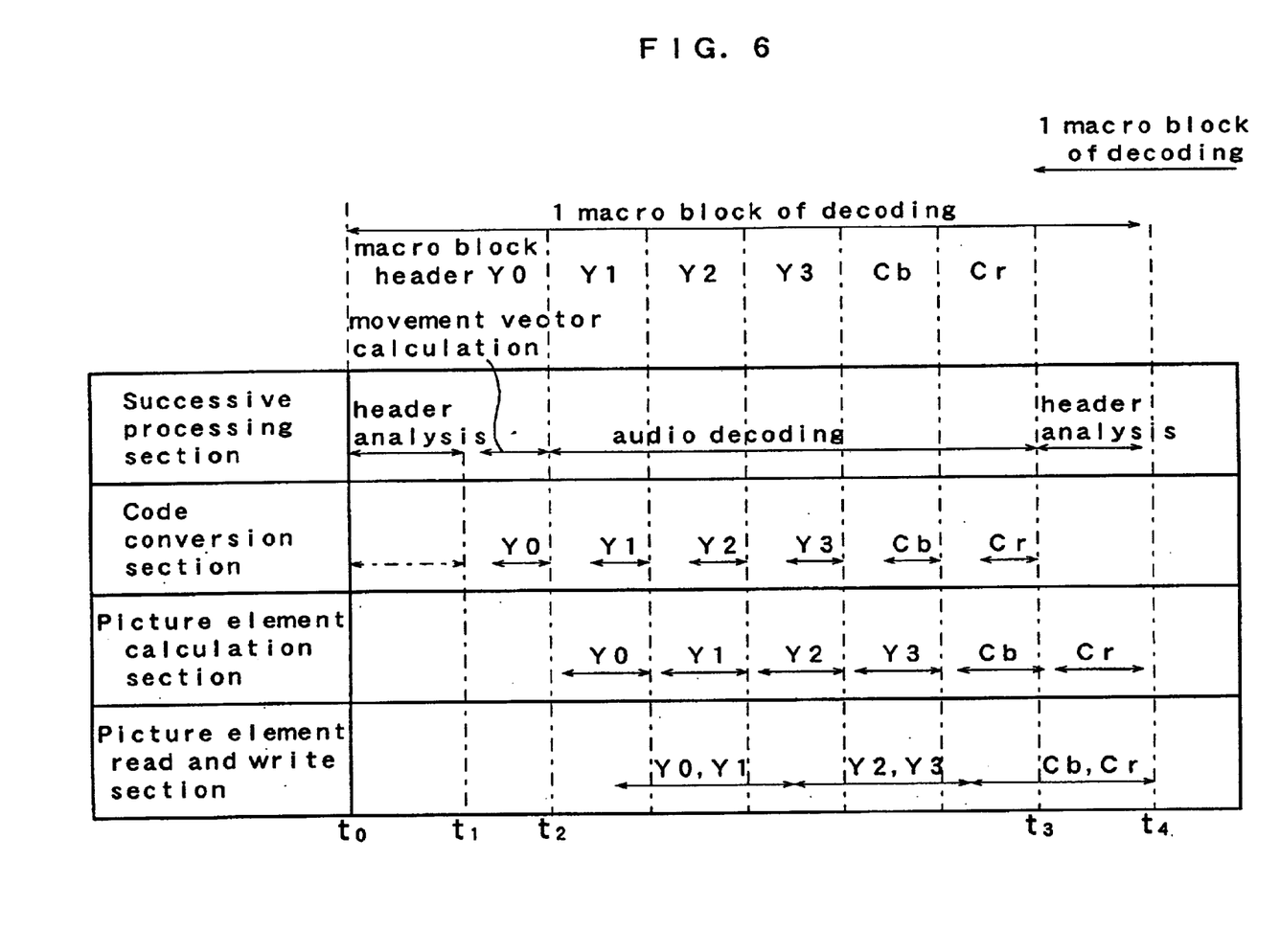
FIG. 6 is a time chart showing the timing of the processing performed by the main sections of a decode processing section 2200 of the embodiment.

The timing of the processing performed by each of the principal elements of the decode processing section 2200 in this embodiment is shown in FIG. 6. It should be noted that in this figure the time is shown along the horizontal axis, and t0 through t4 are instants upon this time axis. In this figure the successive processing section 2220 first (t0 through t2 performs header analysis processing for one macro block (analysis of the header information and movement vector calculation), by the header analysis processing means 2221 and via the operation thread means 2223. When during this processing the analysis of the header information is complete (at t1), before the movement vector calculation processing, the successive processing section 2220 outputs a VLD start command for the macro block main portion to the code conversion section 2231 via the operation thread means 2223. After the header analysis for one macro block has been completed, the successive processing section 2220 starts (at t2 audio decoding by the audio processing means 2222 via the operation thread means 2223. Then the code conversion section 2231 has completed (at t3) the YLD for the macro block main portion, then the successive processing section 2220 interrupts audio decoding by the header analysis priority means 2226 of the operation thread means 2223, and changes over the thread processing to the header analysis processing means 2221, thus starting header analysis processing.

Thus, if the audio decoding by the audio processing means 2222 is performed by the first audio decode means 2224 (decoding according to the DVD-Video standard), then the changing over of threads by the operation thread means 2223 is performed smoothly. But if it is performed by the second audio decode means 2225 (decoding according to the DVD-Audio standard), then interrupt timing is restricted by the interrupt prevention setting means 2227. As has been touched upon by the above explanation, this is done because, when the audio decoding for reproducing a program stream in the DVD-Video standard is compared to the video processing which must handle moving image reproduce processing, sufficient processing for the video processing can be performed in the time slot between the header analysis for one macro block and the header analysis for the next block, because the amount of processing is less; but, by contrast, with audio decoding when reproducing a program stream in the DVD-Audio standard, the processing amount is great as compared to the video processing which must handle still image reproduce processing in which the shortest display interval is 0.4 seconds. Therefore the thread interruption by the operation thread means is restricted by the interrupt prevention setting means 2227. By doing this, it is possible to ensure real time audio processing in the DVD-Audio standard as well.

The operation of the audio and video processing apparatus structured as described above will now be explained. It should be understood that for the convenience of description, in this embodiment, first the operation of the input and output processing section and the decoding section for decoding according to the DVD-Video standard will be explained, and subsequently the operation of the input and output processing section and the decoding section for decoding according to the DVD-Audio standard will be explained.

<The Input and Output Processing Section During Decoding According to the DVD-video Standard>

First, before starting decoding, host communication information is stored in the I/O memory 2131 under control (by the host interface means 2135) of the I/O processor 2130 via the host I/F section 2170. Here, the audio decoder for the DVD-Video standard is selected according to audio decoder selection information which selects the audio encoding method.

Next, in the input and output processing section 2100, a program stream which is asynchronously input from the stream input section 2110 is analysed under control of the I/O processor 2130 (by the stream parsing means 2132) and is subjected to separation processing, and then is temporarily stored in the external memory 2400 via the buffer memory 2120 and the memory controller 2300.

Further, the program stream is fed into the FIFO memory 2210 via the memory controller 2300. At this time, in the I/O processor 2130, the audio decoder selection information stored in the I/O memory 2131 is read out by the internal buffer control assignment means 2138. Since here the DVD-Video standard audio decoder is selected, the first buffer control means 2133 is allocated for video stream transfer. The second buffer control means 2134 is allocated for audio stream transfer. With this program stream according to the DVD-Video standard in which a video stream which handles moving images and an audio stream are multiplexed, this is because the proportion of the data taken up by the video stream is very great as compared to the audio stream.

In this case the first buffer control means 2133, in response to a request from the decode processing section 2200, transfers video stream data from the video buffer area 2410 of the external memory 2400 via the memory controller 2300 to the video stream FIFO 2211 in the FIFO memory 2210. And the second buffer control means 2134 transfers audio stream data from the audio buffer area 2420 of the external memory 2400 via the memory controller 2300 to the audio stream FIFO 2212 in the FIFO memory 2210.

Since the I/O processor 2130 supplies steady video and audio stream data to the FIFO memory 2210 in this manner with no excess or deficiency, the decode processing section 2200 is absolved from the functions of asynchronous input and output, and is able to be specialized in decoding. The processing up to here by the above described input and output processing section 2100 is performed independently in parallel with the operation of the decode processing section 2200.

<The Decode Processing Section During Decoding According to the DVD-video Standard>

First, in the successive processing section 2220, the audio decoder selection information is input via the decode processing section interface means 2136 in the I/O processor 2130, and the first audio decode means 2224 is set as the decoder for the audio processing means 2222.

In the successive processing section 2220, video header analysis processing by the header analysis processing means 2221 and audio decoding by the audio processing means 2222 are repeated alternately, under the control of the operation thread means 2223. The successive processing section 2220 performs header analysis for one macro block by the header analysis processing means 2221, and, after the results of analysis have been notified to the code conversion section 2231, the picture element calculation section 2232, and the picture element read and write section 2233 of the routine task processing section 2280, the code conversion section 2231 is commanded to start VLD for this macro block. After this, the successive processing section 2220 performs movement vector calculation, and outputs the result of this calculation to the picture element read and write section 2233. After this output, the successive processing section 2220 terminates header analysis, via the operation thread means 2223.

The operation thread means 2223 puts the audio processing means 2222 into the execution state after the header analysis has been completed. By the audio processing means 2222 being put into the execution state, the successive processing section 2220 starts audio decoding. Due to the operation of the audio processing means 2222, the audio stream is read in from the audio stream FIFO 2212 by the internal first audio decode means 2224 for audio decoding, and decoding is performed. The audio data after decoding is temporarily stored in the internal memory 2228, and then is DNA transferred by the memory controller 2300 to the external memory 2400.

When during audio decoding the operation thread means 2223 detects the termination of VLD by the code conversion section 2231 of the routine task processing section 2230, since the header analysis processing means 2221 has been put into the execution possible state, the audio decoding is interrupted by the header analysis priority means 2224, and the means processing shifts over to the header analysis processing means 2221, so that header analysis processing commences. Due to this, header analysis for the next macro block by the successive processing section 2220 is started.

Here, since the audio decoding by the audio processing means 2222 is performed by the first audio decode means 2224 (decoding according to the DVD-Video standard), therefore the thread changeover process performed by the operation thread means 2223 gives priority to the video header analysis, and since this is smoothly performed, the processing of the moving image can be maintained in real time.

<The Input and Output Processing Section During Decoding According to the DVD-audio Standard>

In the same way as in the case described above of decoding according to the DVD-Video standard, first, before starting decoding, host communication information is stored in the I/O memory 2131 by the host interface means 2135 via the host I/F section 2170. Here, the audio decoder for the DVD-Audio standard is selected according to audio decoder selection information which selects the audio decoding method.

Next, in the input and output processing section 2100, a program stream which is asynchronously input from the stream input section 2110 is analysed and separated by the stream parsing means 2132, and then is temporarily stored in the external memory 2400 via the buffer memory 2120 and the memory controller 2300.

Further, the program stream is fed into the FIFO memory 2210 via the memory controller 2300. At this time, in the I/O processor 2130, the audio decoder selection information stored in the I/O memory 2131 is read out by the internal buffer control assignment means 2138. Since here the DVD-Audio standard audio decoder is selected, the first buffer control means 2133 is allocated for audio stream transfer, while the second buffer control means 2134 is allocated for video stream transfer. Since this program stream according to the DVD-Audio standard consists entirely of an audio stream, except for still images for preloading, accordingly the audio is allocated to the first buffer control means which can handle a greater maximum data transfer amount.

In this case the second buffer control means 2134, in response to a request from the decode processing section 2200, transfers video stream data from the video buffer area 2410 of the external memory 2400 via the memory controller 2300 to the video stream FIFO 2211 in the FIFO memory 2210. And the first buffer control means 2133 transfers audio stream data from the audio buffer area 2420 of the external memory 2400 via the memory controller 2300 to the audio stream FIFO 2212 in the FIFO memory 2210.

By the above described structure, the audio and video processing apparatus according to this embodiment is enabled to attain DVD-Audio decode compatibility without any accompanying increase in circuit complication or calculation processing amount being entailed by buffer control processing. According to this embodiment, for the buffer control processing required by DVD-Audio decode compatibility, it is only necessary additionally to provide the buffer control assignment means 2138 which changes over the decoder selection from the host CPU.

<The Decode Processing Section During Decoding According to the DVD-audio Standard>

In the same way as in the case described above of decoding according to the DVD-Video standard, first, in the successive processing section 2220, the audio decoder selection information is input via the decode processing section interface means 2136 in the I/O processor 2130, and the second audio decode means 2225 is set as the decoder for the audio processing means 2222.

In the successive processing section 2220, video header analysis processing by the header analysis processing means 2221 and audio decoding by the audio processing means 2222 are repeated alternately, under the control of the operation thread means 2223. Although the operational procedure etc. is basically almost the same as in the case of decoding according to the DVD-Video standard described above, the processing which detects the termination of VLD by the code conversion section 2231 during audio decoding involves much more delay, as compared with the case during decoding according to the DVD-Video standard, and as a result the time required for audio processing is much longer.

Here interrupt timing is restricted by the interrupt prevention setting means 2227, because the decoding is performed by the second audio decode means 2225 (decoding according to the DVD-Audio standard). As has been touched upon by the above explanation, when the audio decoding for reproducing a program stream in the DVD-Video standard is compared to the video processing which must handle moving image reproduce processing, sufficient processing for the video processing can be performed in the time slot between the header analysis for one macro block and the header analysis for the next block, because the amount of processing is less. On the other hand, for the audio decoding when reproducing a program stream in the DVD-Audio standard, the processing amount is great as compared to the video processing which must handle still image reproduce processing in which the shortest display interval is 0.4 seconds. Accordingly the thread interruption by the operation thread means 2223 is restricted by the interrupt prevention setting means 2227. By doing this, it becomes possible to avoid any temporary lack of processing capability due to the still image processing. Thus, it becomes easy to implement appropriate decoding according to both the DVD-Video standard and the DVD-Audio standard, without any necessity of increasing the processing capability of the successive processing section. And it is possible to ensure that the audio processing is performed in real time.

By the above construction, the audio and video processing apparatus according to this embodiment is able to implement decoding in the DYD-Audio standard without this decoding entailing any accompanying increase of circuit complexity or calculation processing amount. According to this embodiment, for the decoding according to the DVD-Audio standard, it is only necessary to add the interrupt prevention setting means to the audio processing means.

What is claimed is:

1. An audio and video processing apparatus which decodes and reproduces data streams of at least two types, including video and audio streams, in which the amounts of video and audio information differ from one another, comprising:

an external memory which includes buffer areas for video and audio which store a video stream and an audio stream, respectively;

a decode processing section which includes a video stream FIFO and an audio stream FIFO which respectively transfer a video stream and an audio stream from said external memory, and which decodes the video and audio streams;

a stream parsing means which separates an inputted data stream into a video and an audio stream, and directs data transfer to said buffer areas for video and audio within said external memory;

first and second buffer control means whose data transfer amounts differ from one another, and which perform transfer of video and audio streams from said buffer areas for video and audio within said external memory respectively to said video and audio stream FIFOs; and a buffer control assignment means which assigns said first and second buffer control means, said buffer areas for video and audio, and said video and audio stream FIFOs, according to an audio decoder selection information of data stream.

2. An audio and video processing apparatus which decodes and reproduces data streams of at least two types, including video and audio streams, in which the amounts of video and audio information differ from one another, comprising:

an external memory which includes buffer areas for video and audio which store a video stream and an audio stream, respectively;

a decode processing section which includes a video stream FIFO and an audio stream FIFO which respectively transfer a video stream and an audio stream from said external memory, and which decodes the video and audio streams;

a stream parsing means which separates an inputted data stream into a video and an audio stream, and directs data transfer to said buffer areas for video and audio within said external memory;

first and second buffer control means whose data transfer amounts differ from one another, and which perform transfer of video and audio streams from said buffer areas for video and audio within said external memory respectively to said video and audio stream FIFOs; and buffer control assignment means which determines the assignment of said first and second buffer control means, said video and audio buffer areas of said external memory, and said video and audio stream FIFOs, according to an audio decoder selection information showing a decoding type of the audio stream.

3. An audio and video processing apparatus according to claim 2, wherein, taking the maximum data transfer rates of said first buffer control means and said second buffer control means as X and Y respectively, and taking the number of their processing clock cycles per unit time as A and B respectively, the relationships X>Y and A>B hold.

4. An audio and video processing apparatus according to claim 3, which decodes program streams which conform to first and second video and audio standards for video and audio recording, wherein, in said second video and audio standard, the amount of video information is less and the amount of audio information is more, than in said first video and audio standard; and wherein said buffer control assignment means, if transmitted audio decoder selection information designates audio decoding according to said first video and audio standard, assigns said first buffer control means to said video buffer area and said video stream FIFO, and assigns said second buffer control means to said audio buffer area and said audio stream FIFO.

5. An audio and video processing apparatus according to claim 3, which decodes program streams which conform to first and second video and audio standards for video and audio recording, wherein, in said second video and audio standard, the amount of video information is less and the amount of audio information is more, than in said first video and audio standard; and wherein said buffer control assignment means, if transmitted audio decoder selection information designates audio decoding according to said second video and audio standard, assigns said first buffer control means to said audio buffer area and said audio stream FIFO, and assigns said second buffer control means to said video buffer area and said video stream FIFO.

6. An audio and video processing apparatus according to claim 3, which decodes program streams which conform to first and second video and audio standards for video and audio recording, wherein, in said second video and audio standard, the amount of video information is less and the amount of audio information is more, than in said first video and audio standard; and wherein said buffer control assignment means:

if transmitted audio decoder selection information designates audio decoding according to said first video and audio standard, assigns said first buffer control means to said video buffer area and said video stream FIFO, and assigns said second buffer control means to said audio buffer area and said audio stream FIFO; and, if transmitted audio decoder selection information designates audio decoding according to said second video and audio standard, assigns said first buffer control means to said audio buffer area and said audio stream FIFO, and assigns said second buffer control means to said video buffer area and said video stream FIFO.

7. An audio and video processing apparatus which decodes and reproduces data streams of at least two types, including video and audio streams, in which the amounts of video and audio information differ from one another, comprising an input/output processing section, a decode processing section, a memory controller, and an external memory; and in which:

said input/output processing section comprises:

a stream input section which inputs a data stream asynchronously from outside, a buffer memory which is used as an internal buffer during data transfer, and an I/O processor which operates while switching over a plurality of task means;

said decode processing section comprises:

a successive processing section which performs header analysis of specified blocks included in said video stream and decodes said audio stream, a routine task processing section which, in parallel with the decoding processing of said successive processing section, decodes said video stream excluding header analysis processing, an audio stream FIFO which transfers to the successive processing section an audio stream which is transferred by said memory controller from said external memory, and a video stream FIFO which transfers to the routine task processing section a video stream which is transferred by said memory controller from said external memory;

said memory controller is a controller which performs control of data input/output for the external memory;

said external memory includes buffer areas for video and audio which store video and audio streams transferred by said memory controller; and:

said I/O processor for said input/output processing section comprises:

a stream parsing means which separates said data stream inputted by said stream input section and transferred into said buffer memory into a video and an audio stream, and directs said memory controller to transfer data to said buffer areas for video and audio within said external memory, first and second buffer control means which perform transfer of video and audio streams from buffer areas within said external memory for video or audio to said video and audio stream FIFOs; and a buffer control assignment means which assigns said first and second buffer control means, said buffer areas for video and audio, and said video and audio stream FIFOs, according to an audio decoder selection information of said data stream.

8. An audio and video processing apparatus according to claim 7, wherein said audio and video processing apparatus performs input and output processing by said input/output processing section, and decoding by said decode processing section, in parallel.

9. An audio and video processing apparatus according to claim 7, wherein:

said input/output processing section comprises a host interface section which performs signal transmission between an external CPU and said I/O processor;

said I/O processor comprises an I/O memory which at least stores host communication information;

said host communication information includes audio decoder selection information which designates the method for decoding said audio stream;

and said buffer control assignment means is an assignment means which determines the assignment of said first and second buffer control means, said video and audio buffer areas of said external memory, and said video and audio stream FIFOs, according to said audio decoder selection information.

10. An audio and video processing apparatus according to claim 9, wherein, taking the maximum data transfer rates of said first buffer control means and said second buffer control means as X and Y respectively, and taking the number of their processing clock cycles per unit time as A and B respectively, the relationships X>Y and A>B hold.

11. An audio and video processing apparatus according to claim 10, which decodes program streams which conform to first and second video and audio standards for video and audio recording, wherein, in said second video and audio standard, the amount of video information is less and the amount of audio information is more, than in said first video and audio standard;

and wherein said buffer control assignment means, if transmitted audio decoder selection information designates audio decoding according to said first video and audio standard, assigns said first buffer control means to said video buffer area and said video stream FIFO, and assigns said second buffer control means to said audio buffer area and said audio stream FIFO.

12. An audio and video processing apparatus according to claim 10, which decodes program streams which conform to first and second video and audio standards for video and audio recording, wherein, in said second video and audio standard, the amount of video information is less and the amount of audio information is more, than in said first video and audio standard; and wherein said buffer control assignment means, if transmitted audio decoder selection information designates audio decoding according to said second video and audio standard, assigns said first buffer control means to said audio buffer area and said audio stream FIFO, and assigns said second buffer control means to said video buffer area and said video stream FIFO.

13. An audio and video processing apparatus according to claim 10, which decodes program streams which conform to first and second video and audio standards for video and audio recording, wherein, in said second video and audio standard, the amount of video information is less and the amount of audio information is more, than in said first video and audio standard;

and wherein said buffer control assignment means: if transmitted audio decoder selection information designates audio decoding according to said first video and audio standard, assigns said first buffer control means to said video buffer area and said video stream FIFO, and assigns said second buffer control means to said audio buffer area and said audio stream FIFO; and, if transmitted audio decoder selection information designates audio decoding according to said second video and audio standard, assigns said first buffer control means to said audio buffer area and said audio stream FIFO, and assigns said second buffer control means to said video buffer area and said video stream FIFO.

14. An audio and video processing apparatus according to claim 9, wherein said successive processing section comprises:
- a header analysis processing means which performs header analysis of specified blocks included in the video stream;
- an audio processing means which comprises at least a first audio decode means which performs audio decoding of an audio stream according to a first video and audio standard, and a second audio decode means which performs audio decoding of an audio stream according to a second video and audio standard; and an operation thread means which performs changeover of said header analysis processing means and said audio processing means.

15. An audio and video processing apparatus according to claim 7, which decodes audio and video streams which conform to first and second video and audio standards for video and audio recording, wherein, in said second video and audio standard, the amount of video information is less and the amount of audio information is more, than in said first video and audio standard; and wherein said successive processing section comprises:
- a header analysis processing means which performs header analysis of specified blocks included in a video stream;
- an audio processing means which comprises at least a first audio decode means which performs audio decoding of an audio stream according to said first video and audio standard, and a second audio decode means which performs audio decoding of an audio stream according to said second video and audio standard; and
- an operation thread means, which performs changeover of said header analysis processing means and said audio processing means;
- wherein said operation thread means comprises a header analysis priority means which performs thread changeover while giving higher priority to header analysis processing of specified blocks included in the video stream by said header analysis processing means than to audio decoding of said audio stream by said second audio decode means; and
- wherein said audio processing means further comprises an interrupt prevention setting means which prevents interruption of said audio processing means from said operation thread means.

* * * * *